United States Patent [19]

Burgess et al.

[11] Patent Number: 4,792,783
[45] Date of Patent: Dec. 20, 1988

[54] VEHICULAR FUNCTION CONTROLLER HAVING ALTERABLE FUNCTION DESIGNATORS

[75] Inventors: James P. Burgess, Camarillo, Calif.; Thomas R. Wheeler, West Bloomfield, Mich.

[73] Assignee: Electro-Mechanical Products, Rochester, Mich.

[21] Appl. No.: 860,547

[22] Filed: May 7, 1986

[51] Int. Cl.[4] ............................................. B60Q 3/00
[52] U.S. Cl. ............................. 340/22; 340/52 F; 340/365 VL
[58] Field of Search ............... 340/54, 365 VL, 52 F, 340/53, 712, 22; 364/424; 180/78; 307/10 R

[56] References Cited

U.S. PATENT DOCUMENTS

| | | | |
|---|---|---|---|
| 4,078,257 | 3/1978 | Bagley | 340/365 VL X |
| 4,313,108 | 1/1982 | Yoshida | 340/365 VL |
| 4,368,454 | 1/1983 | Pilatzki | 340/22 |
| 4,376,298 | 3/1983 | Sokol et al. | 340/52 F X |
| 4,405,924 | 9/1983 | Bhinoda et al. | 340/825.72 |
| 4,435,648 | 3/1984 | Goode, III | 307/10 R |
| 4,438,425 | 3/1984 | Tsuchida et al. | 340/55 |
| 4,454,501 | 6/1984 | Butts | 340/365 VL X |
| 4,456,903 | 3/1981 | Kishi et al. | 340/54 |
| 4,464,933 | 8/1984 | Santis | 340/22 X |
| 4,608,550 | 8/1986 | Umebayashi et al. | 340/22 |
| 4,609,904 | 9/1986 | Paine | 340/54 X |
| 4,611,306 | 9/1986 | Crehan et al. | 340/712 X |
| 4,635,029 | 1/1987 | Yamada | 340/22 |

FOREIGN PATENT DOCUMENTS 2095427 9/1982 United Kingdom ............... 364/424

OTHER PUBLICATIONS

"Technical Highlights", *Car and Driver*, Csere, Oct. 1985, pp. 57–59.

Primary Examiner—Joseph A. Orsino
Assistant Examiner—Brian R. Tumm
Attorney, Agent, or Firm—Krass & Young

[57] ABSTRACT

A multifunction control system for a vehicle includes a plurality of switches, each switch adapted to control a plurality of vehicular functions. Each switch has associated therewith a display element for indicating which of the functions that switch is controlling. The system further includes a microprocessor based controller which mediates which designator each display element will exhibit as well as which vehicular function a given switch will control. The system is readily adapted to a menu-driven mode of operation, and the switches may be mounted upon the steering wheel of a vehicle.

16 Claims, 8 Drawing Sheets

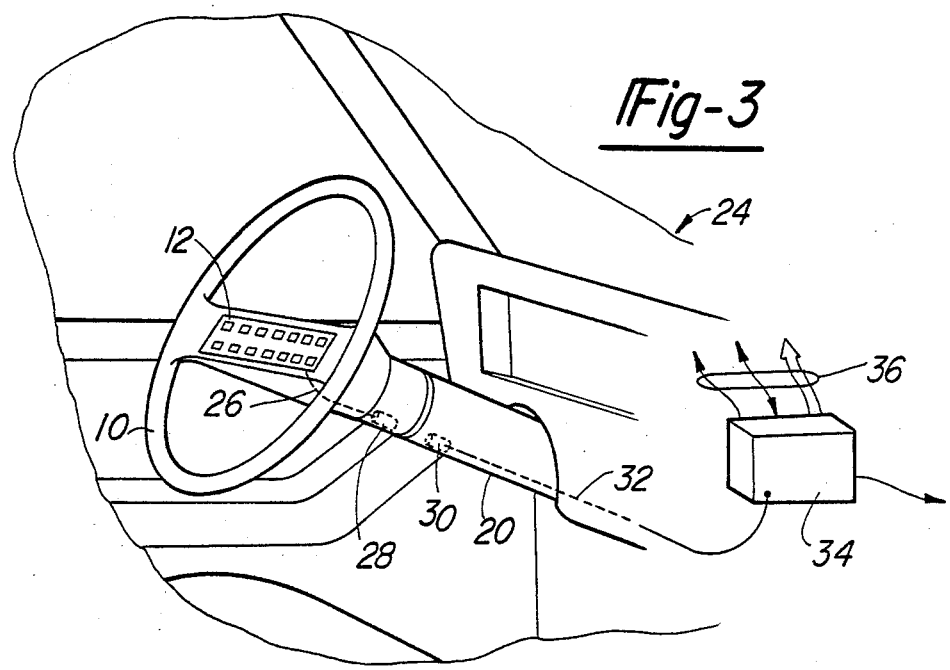
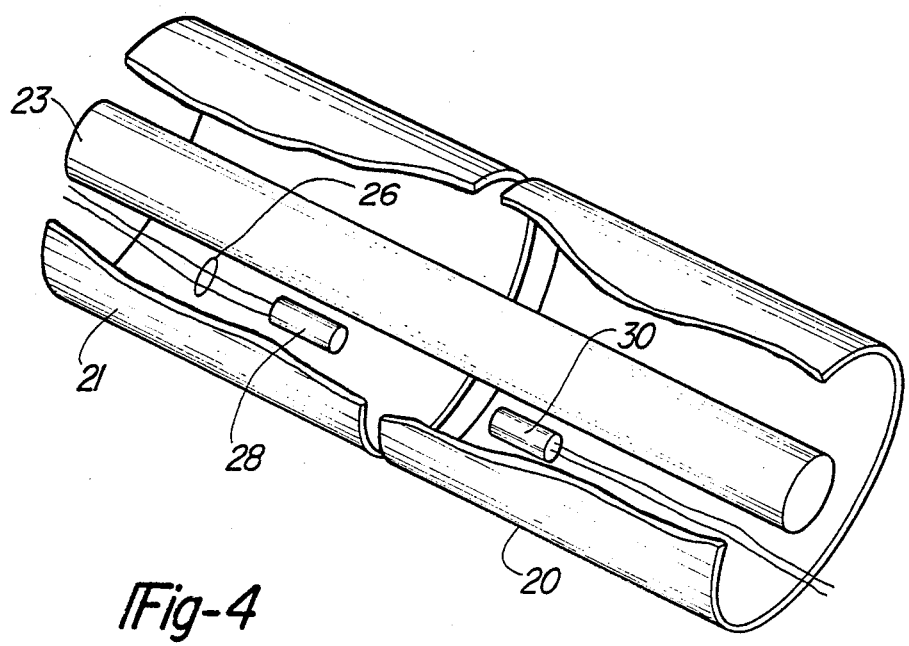

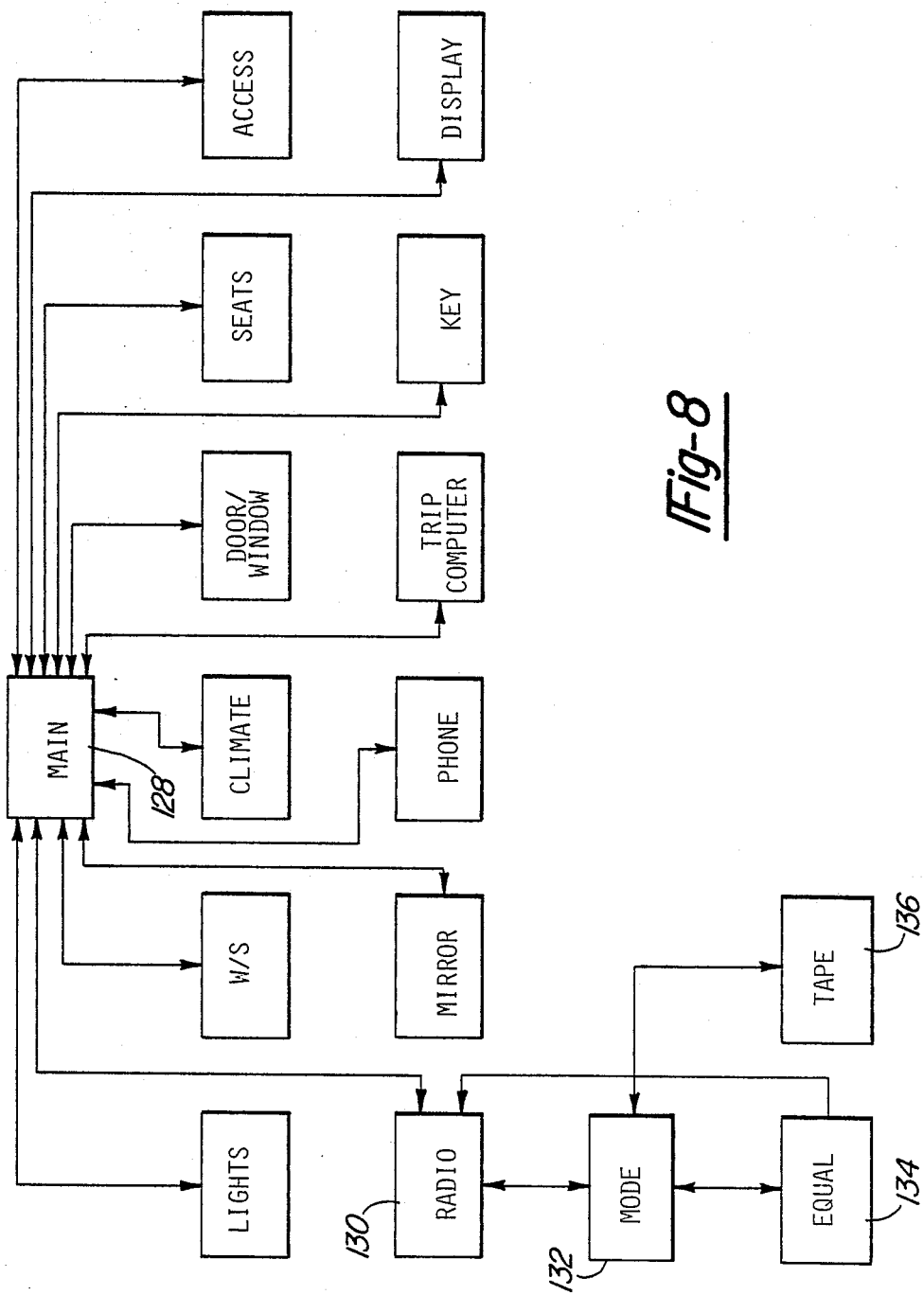

VEHICULAR FUNCTION CONTROLLER HAVING ALTERABLE FUNCTION DESIGNATORS

FIELD OF THE INVENTION

This invention relates to apparatus for use in a vehicle for adjusting operator controllable functions and, more particularly, to such apparatus having a display and associated switches for changing and causing the display of a variety of vehicular functions and including means for transmitting the control signals within the vehicle.

BACKGROUND OF THE INVENTION

Virtually all of the controls for operator controllable functions in present-day vehicles, ranging from automobiles and trucks to farm implements and aircraft, are located on their dashboards, seats, and/or doors. To operate such a control requires the operator to both move a hand from the steering wheel to the control and to divert his attention from the view ahead to locate the control to be operated. This diversion can be both unsafe and inconvenient.

Systems for overcoming these drawbacks by mounting controls on or near the vehicle steering wheel have been proposed. However, these systems fail to satisfy customer needs because they either (1) have too many switches or (2) control only a few functions. To illustrate the first extreme, a proposed prototype van, pictured in the Jan. 13, 1986 edition of the Detroit Free Press and the May 1986 issue of Car and Driver magazine, is equipped with a steering wheel having over 40 switches--certainly enough to distract and confuse the operator who is deciding which switch to activate. At the other extreme, the system disclosed by Kishi et al, in U.S. Pat. No. 4,456,903 has a small number of steering wheel-mounted switches for operating a speed control device. In contrast to these two extremes, it is highly desirable to control more functions with a small number of switches.

Operator-actuated controls are used only relatively infrequently and the functions to be served tend to cluster in natural groups of a few related functions, such as radio controls, climate controls, and so forth. It is therefore possible to use only a few switches to control many functions, group by group. This can be done by dedicating the switches to a single group of related functions at a time, and by associating the switches with a variable display that shows the specific function controlled by each switch.

To preserve the safety of operating a vehicle, it is important that the switches be easy to locate and that they provide at least a non-visual feedback to the user, such as a tactile sensation, indicating that the switch has been activated.

Accordingly, it would be useful to have a controller for operator-actuated functions located in the proximity of the operator, the controller being capable of controlling many vehicular functions through an assembly having a relatively small number of switches associated with a display of alterable function designators.

SUMMARY OF THE INVENTION

The present invention provides a vehicle function controller, located in the proximity of the vehicle operator, operable by the operator through a small array of pushbuttons, such as snap-action switches, and an associated display. The display shows the present functional designation of each associated switch, as well as the status of the control variable it affects, when appropriate. The functional designations are alterable. The controller has a microprocessor for controlling which alterable designators are shown on the display and, consequently, causing one of a variety of "menus" to be displayed and used in conjunction with the pushbuttons. Electrical power is provided to the steering wheel-mounted controller through means of a self-contained battery, with back-up power to recharge the battery being provided by a photovoltaic cell which receives light from a source mounted to the vehicular body.

Desired functional control changes are entered through the switches in conjunction with a display of the appropriate menu. Signals which effect these changes are encoded and transmitted from the steering wheel to a receiver which is located remotely from the operator.

The encoded received signals are transformed to electrical signals and passed on to a controller which, in response, distributes the appropriate commands to the various vehicular functions which are to be controlled.

According to one aspect of the invention, the controller comprises a first assembly located near the operator, including a display having portions showing alternate function designators which indicate a selection of one of a plurality of menus of performable control functions, a number of switches, each associated with a different portion of the display, showing the menu of performable control functions, and a microprocessor adapted to receive the signals relating to the activation of the switches. This assembly further includes a signal transmitter connected to the microprocessor for transmitting the signals generated by the microprocessor means, and may include a power supply, such as a battery, and a photovoltaic energy converter adapted to receive light from a source external to the steering wheel and to replenish the electrical power supplied by the power supply. The controller also includes an assembly located remotely from the operator, including a control signal receiver for receiving signals produced by the transmitter, and a control signal distributor for receiving the electical signals produced by the control signal receiver and distributing appropriate control signals in response. The remote assembly may also include a light source operable to generate light energy directed toward the photovoltaic energy converter.

The transmitted signals can uniquely specify the function to be controlled or, alternatively, first specify the menu being displayed and then the switch which is activated. The menu specification signal can be transmitted each time a switch is activated, or only when a new menu is caused to be displayed.

The first assembly can be attached to a vehicle steering wheel and can further include a microprocessor-accessible non-volatile memory for storing current values of appropriate control variables. It can also include a read-only memory (ROM) means for storing the program used by the microprocessor.

Further embodiments of the present invention can comprise a feedback signal receiver connected to the control signal distributor for converting electrical signals from the signal distributor to transmittable signals and a receiver, located near the operator, for converting the feedback control signals to electrical signals for use by the microprocessor. Signals may be transmitted between the two assemblies through, for example, optical, inductive, or Hall effect transducers.

BRIEF DESCRIPTION OF THE DRAWINGS

FIG. 3 is a schematic view of the vehicular steering wheel of FIG. 1 attached to its steering column and conveying signals from the first assembly of the present invention to the second assembly of the present invention;

FIG. 4 is a close-up view of the steering column of FIG. 3, showing an optical link for conveying signals from the first assembly to the second assembly;

FIG. 8 is a diagram showing the hierarchy of the menus of one embodiment of the present invention.

DETAILED DESCRIPTION OF THE PREFERRED EMBODIMENT

Referring now to the figures of the drawings, the preferred embodiment of the present invention can be better understood. While the preferred embodiment will be illustrated in the context of an automobile, it will be readily understood by those skilled in the art of vehicular control design that the present invention is easily adaptable to trucks, motorcycles, military vehicles, farm tractors and other motorized farm vehicles, tracked vehicles, watercraft, and aircraft. Throughout this application, "body" is meant to include all parts of the vehicle, other than those directly manipulated by the vehicle operator to steer the vehicle.

Figure 1:
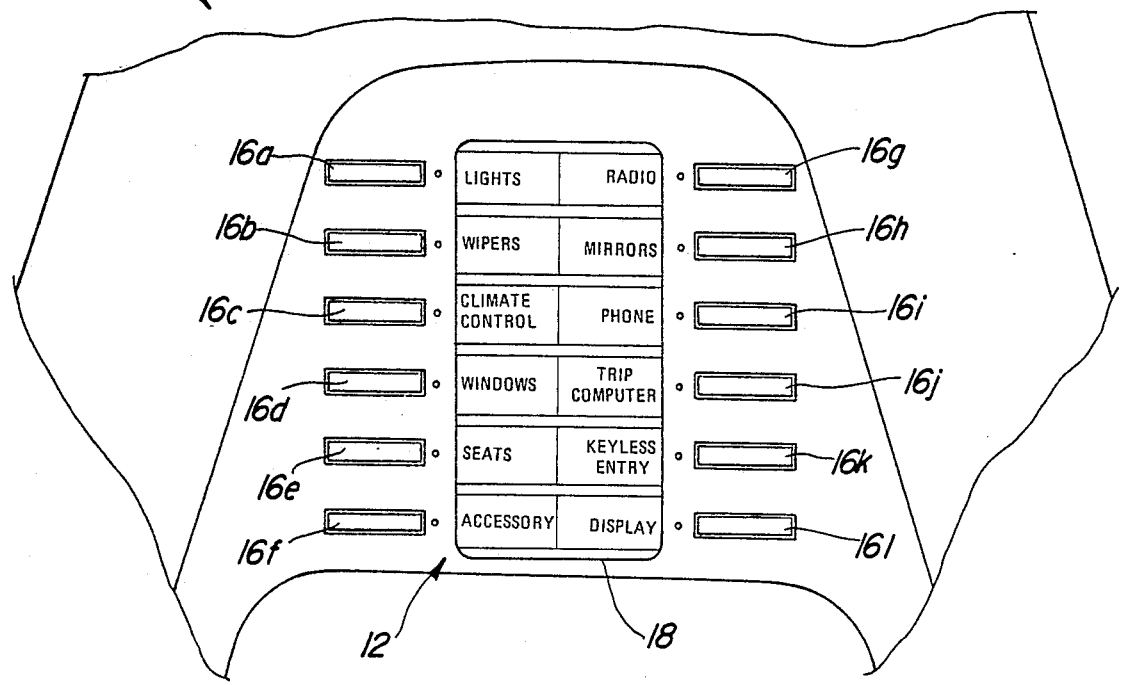
FIG. 1 is a close-up view of a vehicular steering wheel including the first assembly of the present invention.

FIG. 1 is a close-up view of an automotive steering wheel 10 including the first assembly 12 of the present invention. Assembly 12 comprises an array of pushbuttons 16, preferably of a tactile type such as a snap-action switch and a display unit 18. Switches 16 may be organized in a pattern which is ergonomically suitable. Individual switches in array 16 will be designated with a letter suffix. For a given pattern, this designation will be unchanged throughout this application.

In FIG. 1, the array of switches 16 is organized in two columns of six switches each. Display unit 18 is organized in association with switches 16, so that a separate portion of display unit 18 may be allocated to each of switches 16. In the embodiment illustrated in FIG. 1, display unit 18 is a single vertically disposed area, without separation into the portions associated with each switch 16. If desired, however, display unit 18 can be segmented.

Display unit 18 can be based on any of a variety of display technologies, such as liquid crystal displays (LCDs), light emitting diodes (LEDs), electrochromic displays, cathode ray tubes (CRT's), and electroluminescent displays. Display unit 18 will be chosen to be capable of presenting a variety of indicia to the vehicle operator. A dot-matrix display may be appropriate to serve as display unit 18, although any of a number of alternative approaches for displaying the indicia will be apparent to those skilled in the art.

In addition to the controllable functions shown on the steering wheel of FIG. 1, certain other functions which should always be available on the steering wheel (such as a horn), or which will require a dedicated switch, can also be placed on steering wheel 10 independently of assembly 12.

Figure 2:
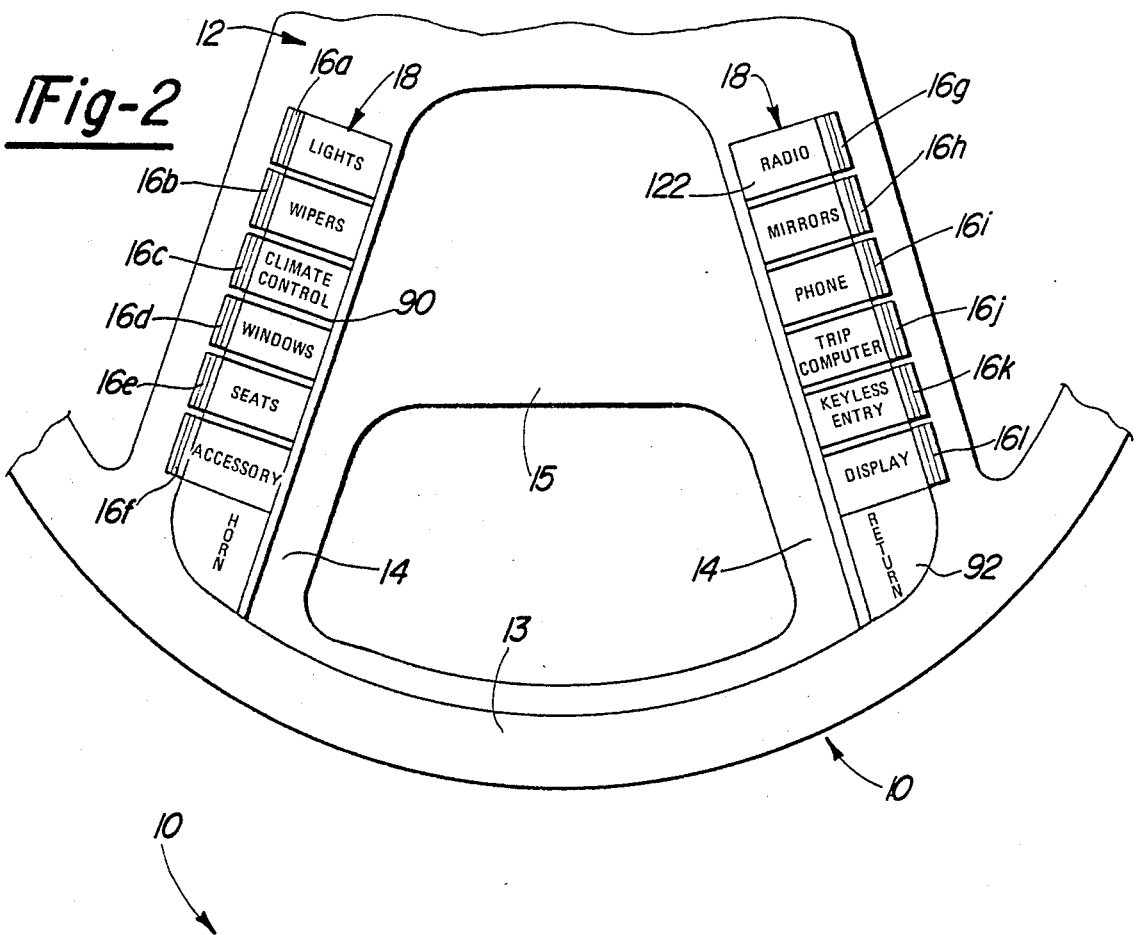
FIG. 2 is a close-up view of another vehicular steering wheel including an alternative embodiment of the first assembly of the present invention, showing a master menu.

FIG. 2 shows an alternative configuration of first assembly 12 built into steering wheel 10. As shown in FIG. 2, steering wheel 10 may comprise a number of spokes 14 radiating from a central portion 15 toward a circumferential ring 13. Display unit 18 is divided into two separate portions, each portion being subdivided into areas associated with each switch 16. In FIG. 2, there are two columns having six switches each, although the number of switches and their configuration can be varied according to non-engineering dictates, such as design and appearance, as long as the number of switches does not exceed some modest number, such as from 12 to 18. Steering wheel 10 in FIG. 2 also shows two switches having fixed designations, such as "HORN" and "RETURN," whose functions will be described in following portions of this detailed description.

In addition, while FIGS. 1 and 2 show a function controller whose first assembly 12 has been built-in to steering wheel 10, the function controller may alternatively take the form of an add-on device and, therefore, be separable from steering wheel 10. In this add-on configuration, the function controller's first assembly can comprise two horizontally disposed display units 18 with associated switches 16.

Generally, this invention can be used in any application where an operator desires to control a relatively large number of functions at remote locations with a realtively small number of switches. Thus, it will be apparent to those skilled in the art that, while the first assemblies of the embodiments used to illustrate the invention are placed on a vehicle's steering wheel, the first assembly can be placed at any location in the proximity of the operator.

FIG. 3 of the drawings shows an embodiment of the present invention in the interior of an automobile. Steering wheel 10, with first assembly 12 attached thereto is rotatable with respect to steering column 20. Steering column 20 is held in fixed position relative to the remainder of automobile body 24. Signals produced by assembly 12 are passed through cable 26 to transmitter means 28. Transmitter 28 can be of the sort which converts electrical signals to optical signals or, alternatively, of the sort which produces a variable magnetic field corresponding to the signals sent on cable 26. Attached to steering column 20 is receiver, 30 which receives the coded signals transmitted by transmitter 28.

If transmitter 28 and receiver 30 are optical devices, there is no particular need to align transmitter 28 and receiver 30 to a high degree of accuray. This is because the light produced by transmitter 28 can be caused to flood the interior of steering column 20 to ensure that receiver 30 receives the signals transmitted by transmitter 28 regardless of the angle of rotation of steering wheel 10. The signal received by optical receiver 30 is transmitted via cable 32 to control second assembly 34.

Likewise, if the transmitter 28 produces variable magnetic fields and receiver 30 is a Hall effect sensor or an inductive pickup, any needed alignment of parts can be readily accomplished to ensure that control signals can be transmitted and received regardless of angular steering wheel position.

Assembly 34 conditions signals received over cable 32, causing appropriate commands, originating from assembly 12, to be sent to the controlled units over appropriate lines 36. In some instances, a feedback signal will be received by assembly 34 from the controlled unit over lines 36.

FIG. 4 shows steering column 20 and the lower rotating portions 21 of steering wheel 10 in a cutaway view. Within steering column 20 and rotating portion 21 is a steering shaft 23 which runs from steering wheel 10 to the steering gear (not shown) of the vehicle. Optical transmitter 28, which may, for example, be an infrared (IR) emitter of the sort available from Motorola as part no. MFOE 71. Photodetector 30, responsive to infrared light, can be purchased from Motorola. Modulated signals reaching transmitter 28 along cable 26 cause emitter 28 to transmit, for example, digital signals which are received by IR detector 30. An asynchronous serial communications format is an appropriate choice for this purpose.

Figure 5:
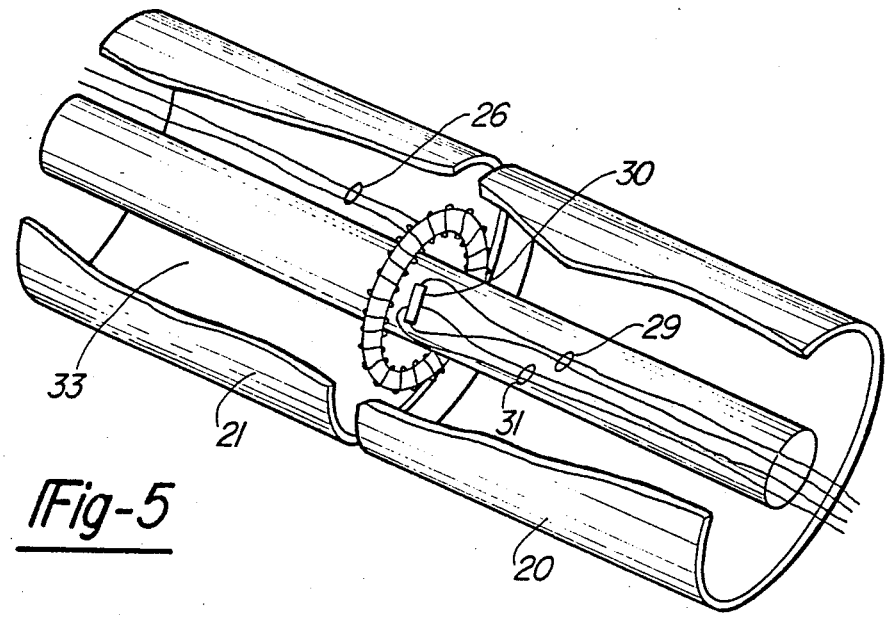
FIG. 5 is a close-up view of the steering column of FIG. 3, showing an alternative link for conveying signals from the first assembly to the second assembly, using a Hall effect transducer.

FIG. 5 is another cutaway view of steering column 20 and the lower portion 21 of steering wheel 10. Steering shaft 23 also connects steering wheel 10 to the steering gear (not shown). As with the discussion of FIG. 4, the transducer of FIG. 5 receives control signals from cable 26. These signals cause a varying magnetic field inside the steering column and receiver 30 responds to these varying magnetic fields. Receiver 30, which may be a Hall effect transducer, is connected to two signals. One wire pair from cable 29 connects to a voltage-sensing device to detect any fluctuations, while the other pair produces a supply voltage on cables 31. Modulation of the signal on line 26 affects the magnetic field within cavity 33, and this modulation is transferrred electronically to controller 34, where it is interpreted and used to produce the desired control signals. The communications format can be an asynchronous serial format.

Alternatively, the communications between the steering wheel 10 and steering column can be accomplished through serial communications by means of either a magnetic induction sensor or direct wires. If wires are used, communications can also be made through a parallel format.

Figure 6:
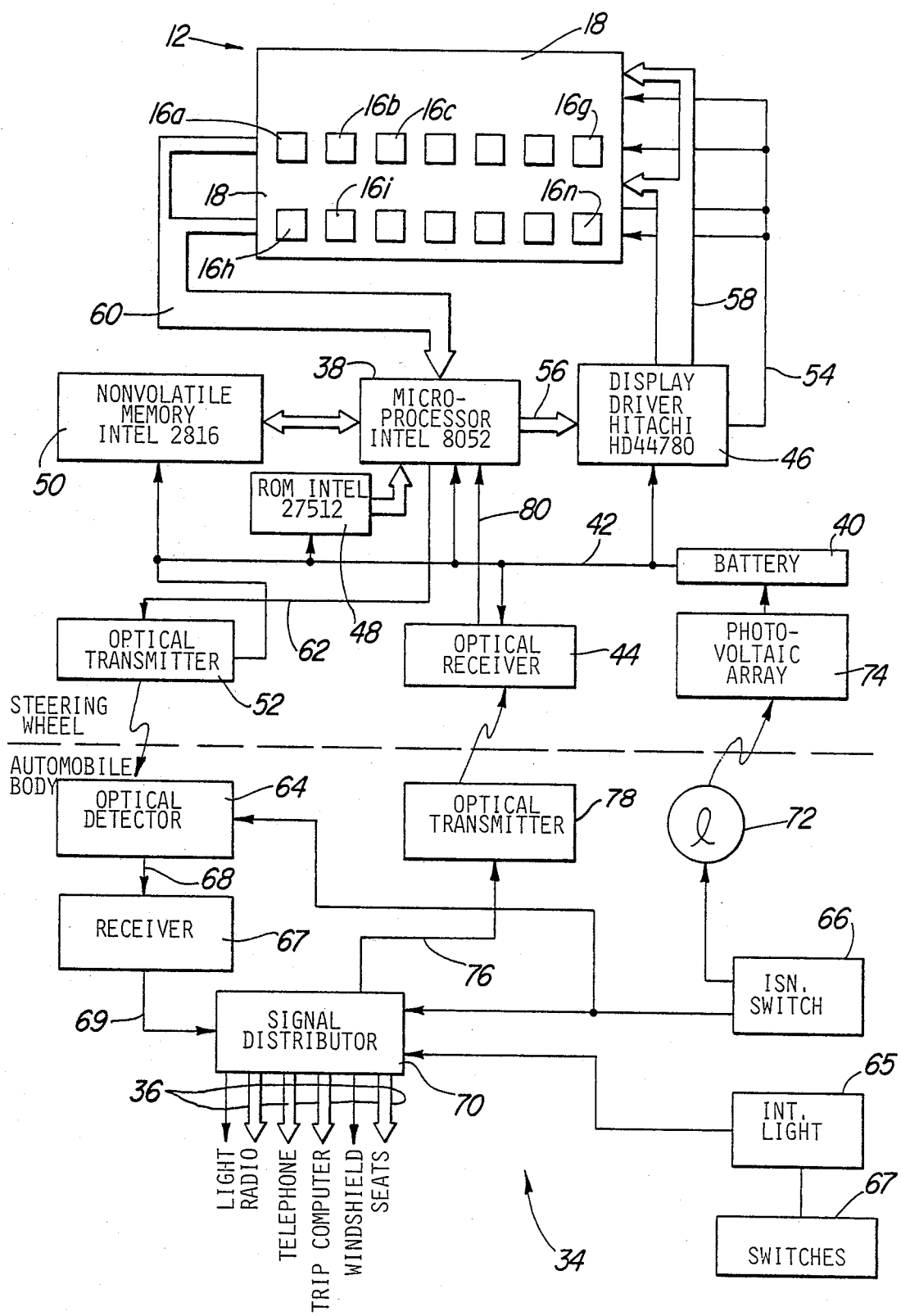
FIG. 6 is a block diagram of the circuitry of one embodiment of the first assembly of the present invention.

FIG. 6 of the drawings is a block diagram of the electronic components of one embodiment of the present invention. The display unit 18 of assembly 12 can, by way of illustration, take the form of two small parallel panels, such as dot matrix liquid crystal display (LCD) units (made by Polaroid or Hitachi) capable of creating a wide variety of indicia. Each of the indicator panels 18 is preferably capable of displaying appropriate indicator symbols or alphanumeric characters simultaneously, as well as a series of special symbols, such as arrows or other indicators, which identify an amount or set points etc. Portions of display unit 18 are associated with each of the switches 16, preferably those portions which are most nearly adjacent to the associated switch, to provide an unambiguous designation of the function provided by depressing each switch. Assembly 12 further comprises two rows of switches 16 which complete electrical contacts when they are depressed.

In addition, assembly 12 comprises microprocessor 38 which is provided with electrical power from rechargeable battery 40 over power supply line 42. Microprocessor 38 can be appropriately chosen from the Intel family, and can be a model 8052. Power supply line 42 also provides power to optical receiver 44, display driver 46, read-only memory (ROM) 48, nonvolatile memory 50, and optical transmitter 52. Display driver 46 can be a Hitachi HO44780, ROM 48 can be an Intel 27512, and non-volatile memory 50 can be an Intel 2816. When first supplied with electrical power, microprocessor 38 executes a computer program from ROM 48. It is this program which microprocessor 38 continually performs, to cause assembly 12 to perform its desired functions.

First assembly 12 supplies electrical power to displays 18 and switches 16. This power is supplied by display driver 46, under the control of microprocessor 38, over power line 54. Microprocessor 38 also provides appropriate signals to display driver 46 over bus 56. Display driver 46, in turn, causes appropriate signals to be transmitted over bus 58 to the appropriate parts of display 18. In turn, microprocessor 38 receives signals from memory contact switches 16a-16n over bus 60. These signals indicate the activation of a switch by a user who is attempting to cause a certain vehicular function to be performed. Microprocessor 38 also stores and reads prior control set point values from the nonvolatile memory 50. These values can be displayed by assembly 12, as will be described more fully in succeeding portions of this detailed description. In response to the receipt of signals signifying the appropriate closure of one or more of switches 16a-16n, microprocessor 38 causes a modulated signal to be transmitted over line 62 to optical transmitter 52. These modulations can be pulsed modulations, or any other suitable form, such as the asynchronous serial format discussed above.

Optical transmitter 52 creates an optical signal, such as an infrared (IR) signal which is receive by optical detector 64 in second assembly 34. Detector 64 (which is supplied its electrical power either when a light 65 is turned on in the interior of the vehicle by activating one of the switches 67, or when ignition switch 66 is turned to the "ON" position to energize the automobile for use) receives the signals tranmitted by optical transmitter 52 and converts them to electrical signals which are then transmitted to receiver 67 over line 68.

The mode of communication to receiver 67 can be of at least two distinct types. In one mode, when the displayed menu is changed, receiver 67 is sent a code by microprocessor 38 designating the new menu. Until the menu is changed again, any subsequent activations of switches 16 are interpreted by receiver 67 in view of the presently displayed menu. Receiver 67 transmits appropriate signals, signifying both the present menu and the activated switch, to signal distributor 70. In another mode, each separate controllable function is assigned to unique code. When controlling a particular function, its code will be used, regardless of the menu displayed or the switch to be operated, to signify that the particular function is to be performed. The interpretation of switch closures and presently displayed menu is made by microprocesor 38, which sends an appropriate unique code to optical transmitter 52. This code is received by detector 64 and interpreted by reeiver 67 which generates an appropriate electrical signal for signal distributor 70. The apparatus described above can be used in either mode, depending on the development of an appropriate program for microprocessor 38.

Closure of ignition switch 66 to energize the vehicle for use also activates light source 72 which, in turn, transmits light to be received by photovoltaic array 74. Photovoltaic array 74 (for example, a silicon solar cell) is attached to the steering wheel and converts light energy received by photovoltaic array to electrical current for recharging battery 40. While assembly 12 can be activated by the act of turning on an interior light (by closing a switch, either directly or by opening a door), this kind of activation is timed function. In other words, if no further action is taken within a moderate period of time, say, 15 seconds, assembly 12 is disconnected from the electrical power. This mode of operation avoids wasting power, but also allows certain functions, such as door locks, to be activated without the need for the vehicle's electrical system to be turned on.

Second assembly 34 is activated when it reeives electrical power upon the activation of ignition switch 66 or interior lights 65. Distributor 70 receives appropriate control signals over line 68 from optical receiver 64 and, upon decoding these signals, causes appropriate control signals to be sent to the various automotive functions to be controlled. Feedback control signals are received over lines 36 by assembly 34, converted to electrical signals, and transmitted over line 76. The signals on line 76 are received by optical transmitter 78 and converted to optical signals which are received by detector 44, mounted on the steering wheel. These feedback signals are converted back to electrical form and transmitted, over line 80, to microprocessor 38.

Among the actions taken by microprocessor 38, upon receipt of appropriate switch closure signals over bus 60, is the display of another menu of indicia on display 18. Appropriate formats for these additional menus are contained in ROM 48 and retrieved from the ROM when a new menu is called for. Non-volatile memory 50 contains values which may be displayed at appropriate places on display unit 18, depending upon the menu in use.

While the foregoing description has shown an optical transmitter/ receiver pair used to communicate between the steering wheel and the automobile body, those skilled in the art will appreciate that alternative transducers, such as the Hall sensor of FIG. 5, or an inductive pickup, can also serve this function.

FIGS. 2, and 7A-7D show details of some of the menus used in connection with the present invention. All menus are displayed on display unit 18 of the controller in FIG. 2. As shown in FIG. 2, the master menu comprises displays relating to other menus which may be chosen (lights, windshield wipers, climate control, door locks/window lifts, seat controls, accessories, radio, mirrors, phone, trip computer, keyless entry, and selectable diagnostic readouts. Other functions could be selected to be displayed on the master menu in FIG. 2 designating switches to be used for controlling the transmission, alarm-enable, hazard warning lights, cruise control, keyless ignition, diagnostic displays, and the horn or return switch, etc. Microprocessor 38 (in FIG. 6) can be programmed to display the master menu each time assembly 12 is reactivated and to revert to the master menu if it has been displaying another menu for a predetermined period of time without any of switches 16 being activated.

Figure 7E:
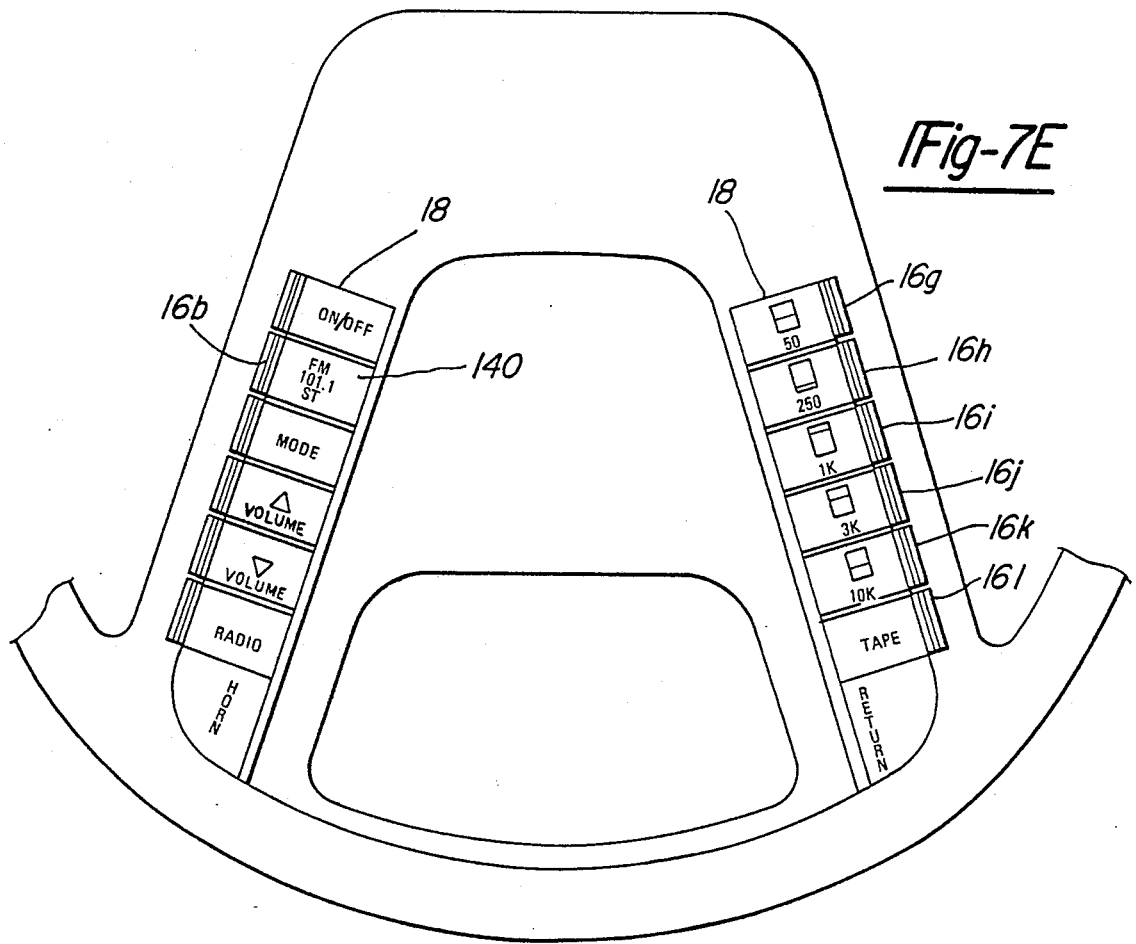
FIGS. 7A–7E are examples of displayable menus, which are alternative to the master menu shown in FIG. 2, provided by the alterable designators of the display of one embodiment of the present invention.
Figure 7A:
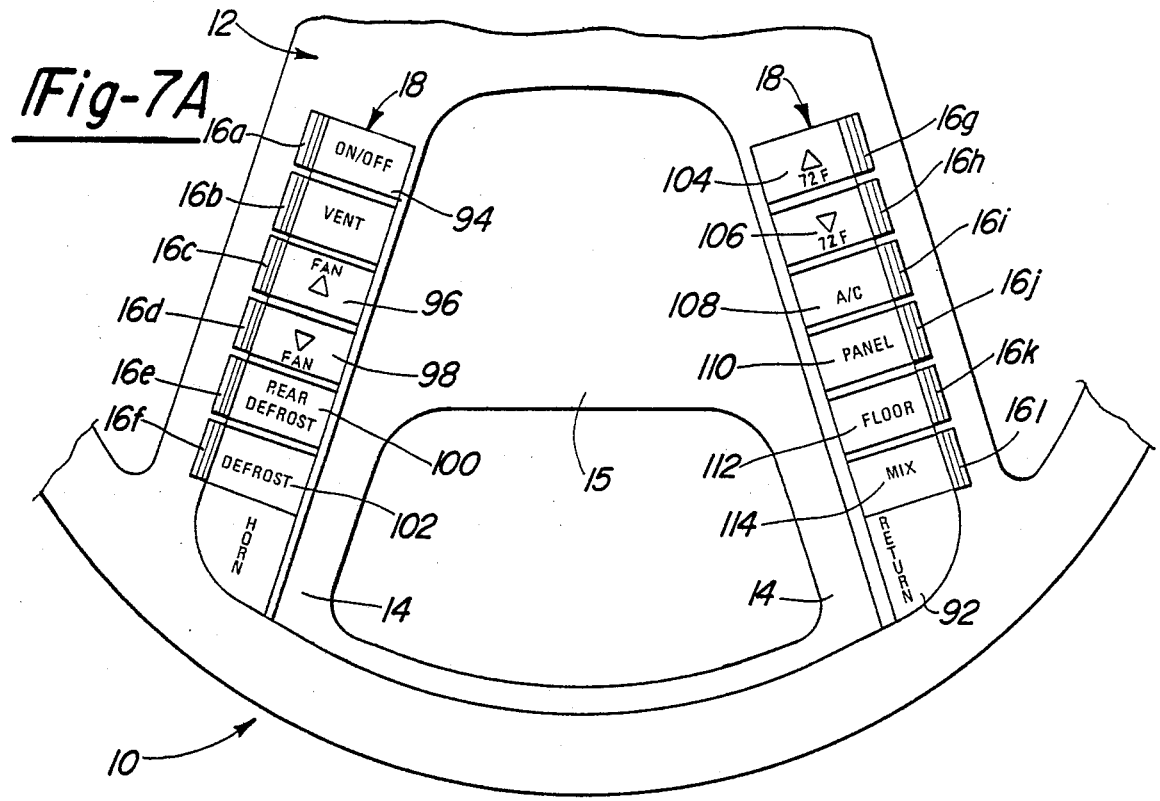

FIG. 7A shows the CLIMATE CONTROL menu, which can be accessed by pressing switch 16c, which is associated with the "CLIMATE CONTROL" designation 90 on display unit 18 in FIG. 2. A major feature of the menu system is the ability to recall the last menu previously displayed by depressing switch 92, associated with the RETURN designation. This RETURN switch is consistently placed in the same position on all menus. Because it can be consistently labelled and positioned, the RETURN switch need not be associated with a portion of display unit 18. Likewise, the HORN switch (i.e., the switch associated with the RETURN designator), which is active in all menus, so it can be placed in a convenient predetermined pposition, such as the lower left corner of the display.

The CLIMATE CONTROL menu controls functions that relate to the interior environment of the automobile. The controls are activated and deactivated by the switch associated with ON/OFF designators 94. Fan speed can be incrementally varied by depressing switch associated with either designation 96 (to increase speed) or switch designation 98 (to decrease speed). The common function served by these two switches ("FAN" in this case) can be caused to appear in the area of display unit 18 containing designations 96 or 98. Heating elements in the rear window (back-light) are activated by the switch corresponding to designator 100, while the switch associated with indicator 102 causes the windshield to defrost.

The desired interior temperature is controlled by the switches adjacent to areas 104 and 106. Within these two areas, the desired temperature can be displayed digitally. Indicia 108 points out the button which activates the air-conditioning system and switches for indicia 110–114 control wherethe cooled air is directed. The only menu which can be accessed from the CLIMATE CONTROL menu is the master menu, shown in Figure 2. Access is achieved by depressing the RETURN switch near area 92, as described earlier.

Figure 7B:
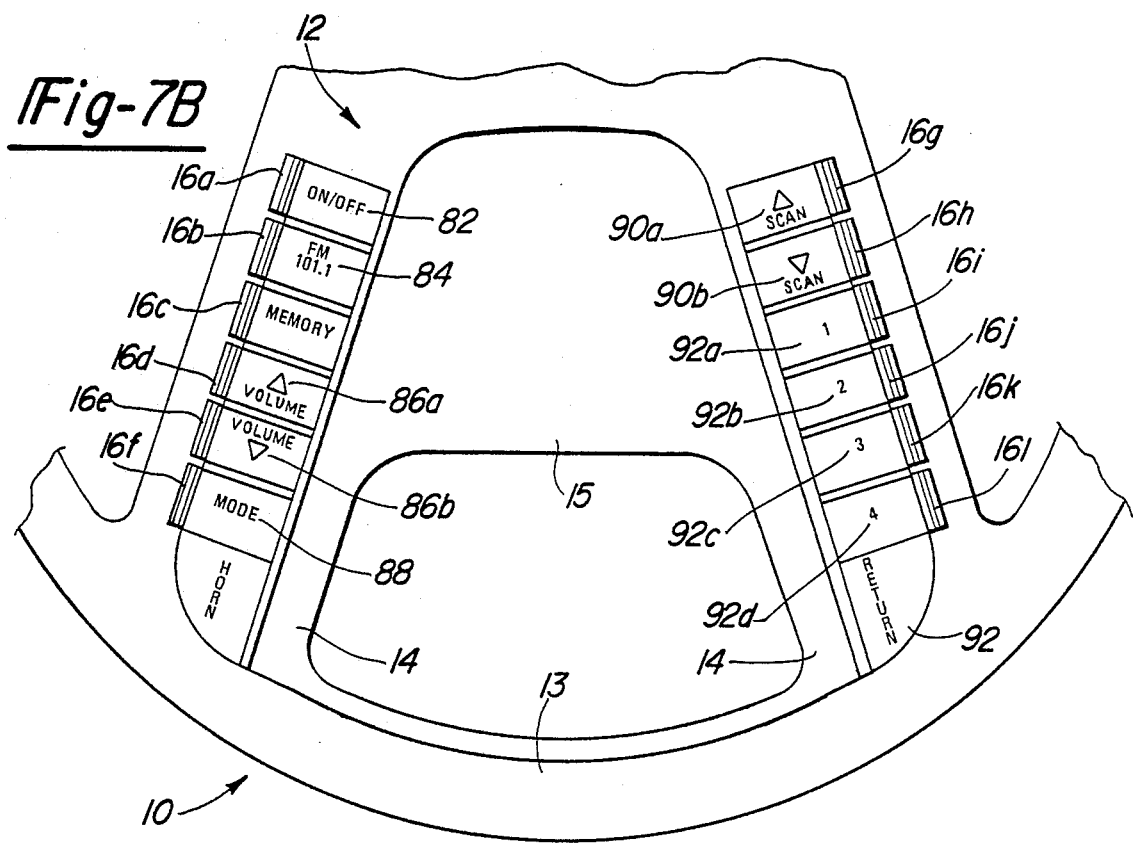

FIG. 7B shows the RADIO menu which, in addition to the toggling switch adjacent to indicia 82, includes digital displays of frequency and radio broadcast band 84, including possibly a stereo indicator 85, and volume controls 86a and b. Areas 86a and b can consist of special up and down arrows or other symbols corresponding to incremental increases or decreases in the radio volume. Other functions relating to radio operation are scan up and scan down switches areas 90a and 90b, respectively, and memorized program switches for insignia 92a–d. Memory switch 16c is used as a set switch in conjunction with the memorized program switches for areas 92a–d while storing broadcast frequencies in non-volatile memory 50 (see FIG. 6).

The volume switches are incremental control switches, like the switches associated with FAN indicia 96 and 98 in FIG. 7A. The scan switches 16g and 16h are likewise incremental switches which cause the frequency selected by the radio to be incremented. Depressing the switch corresponding to indicia 88 causes an entirely separate menu, the MODE menu, to be displayed. The main menu is accessed by depressing the RETURN switch next to area 92d.

Figure 7C:
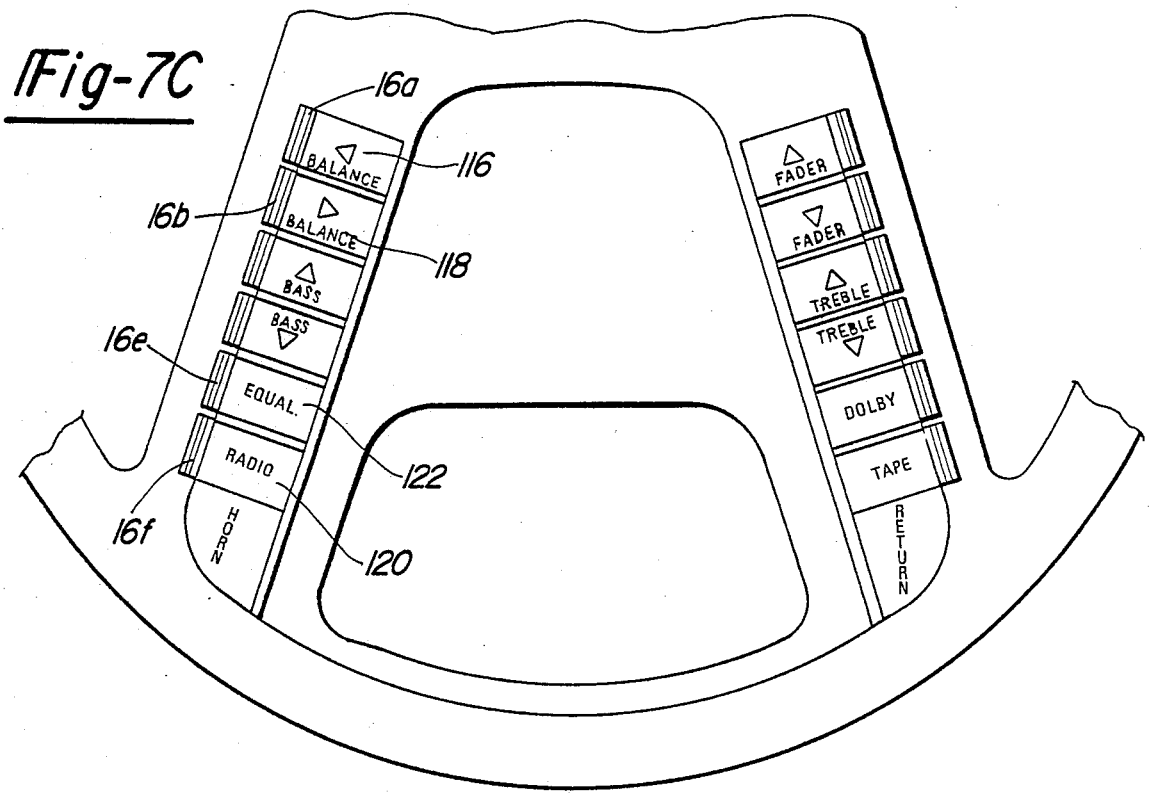

FIG. 7C of the drawings is the MODE menu which may be selected by depressing switch 16f near area 88 in the radio menu shown in FIG. 7B. As shown, in connection with the mode menu, the switches for areas 116 and 118 operate in incremental fashion to cause the left/right balance and front-rear balance of speaker volume to be varied. In adddition, a special symbol, representing the present balance setting, (not illustrated) can appear between areas 116 and 118. Depressing switch 16f next to RADIO indicia 120 causes the RADIO menu shown in FIG. 7B to be displayed, and depressing switch 16e associated with area 122 causes the EQUALizer menu to be displayed. (See FIG. 7D.) The RADIO menu may also be reached from main menu shown in FIG. 2 by depressing the switch for RADIO indicia 120. The BASS, FADER, and TREBLE functions, each using two switches from array 16, can also display special symbols (not illustrated) showing their current settings.

Figure 7D:
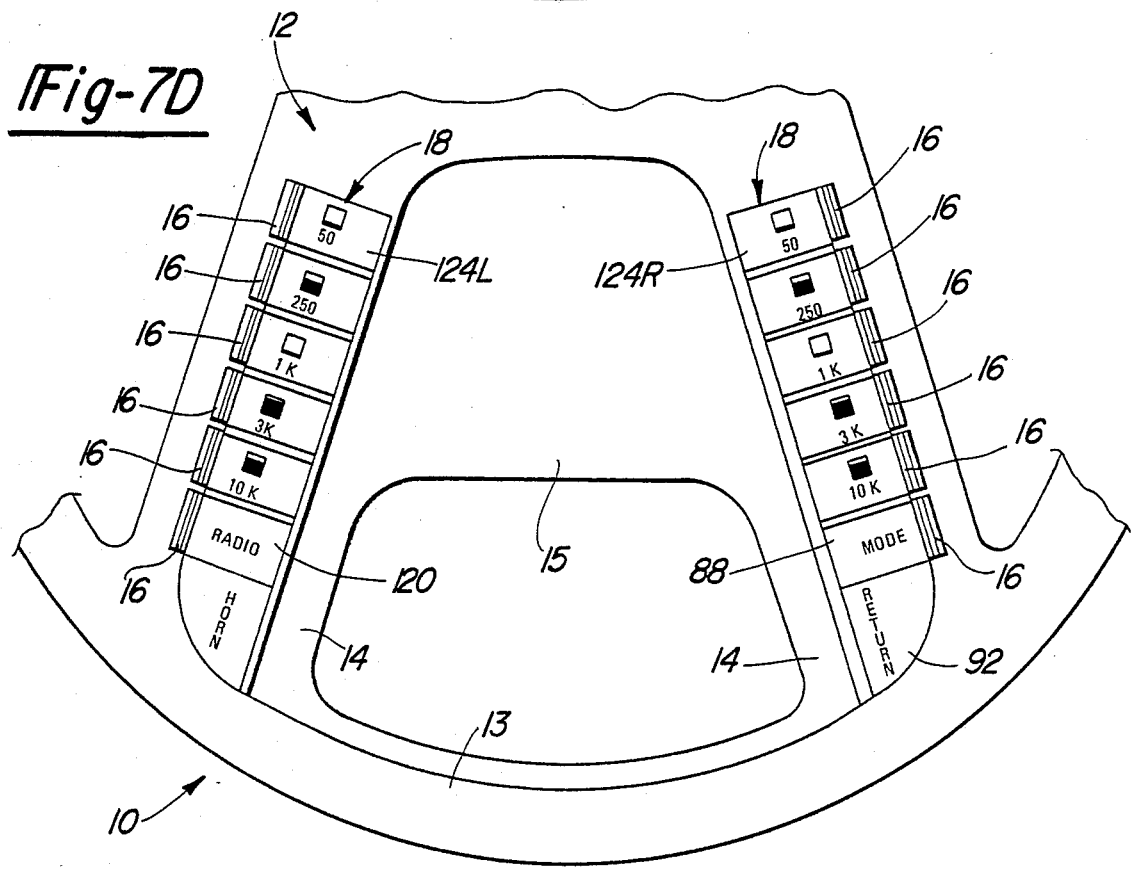

FIG. 7D shows one possible form of the EQUAL menu which may be accessed from the main menu shown in FIG. 7C. Depending upon its orientation, the EQUAL menu may contain non-functional switches or redundant switches. As shown in FIG. 7D, the switches associated with region 124L and 124R can affect the emphasis of the frequencies below 50 Hz. The switch associated with region 124L can incrementally decrease the emphasis of this frequency band, while the switch for region 124R can cause the emphasis to increase. The switch for segment 120 causes the RADIO menu to be displayed, while the switch next to area 88 brings up the MODE menu.

FIG. 7E shows an alternative form of the EQUAL menu. This menu allows the operator to observe the present broadcast band and frequency and whether the signals are received in stereo, through area 140 associated with switch 16b. Also on the lefthand side of the equalizer menu shown in FIG. 7E is a switch allowing choice of the MODE menu, the RADIO menu, and volume controls. The righthand portion of display 18 shows, in bar form, the current settings of each of five equalizer bands. These equalizer settings can be varied by depressing the associated switches 16g–16k until the desired setting is obtained. By operating in a cyclic mode, the switch for the selected frequency band can be held until the alterable designator reaches the desired level. The level cycles from low to high and then back to low again. Depressing switch 161 will activate the TAPE menu (not shown).

FIG. 8 of the drawings illustrates the hierarchy among menus. When operating in the main menu of FIG. 2, any of the other twelve menus to which the main menu is directly connected may be selected by depressing the proper switch (see FIG. 2). By means of the RETURN function, the previously displayed menu may again be displayed. This possibility is signified in FIG. 8 by the double-headed arrows connecting blocks representing the different displayable menus. In addition, if the main menu has been displayed as a result of a "time-out" of a previous menu (say, MODE menu 132), this previous menu can be redisplayed through the RETURN function, even though no arrow is shown connecting these menus in FIG. 8. As may be seen, RADIO menu 130 can be selected from main menu 128. Further, MODE menu 132 may be selected from RADIO menu 130 and RADIO menu 130, EQUAL menu 134, and TAPE menu (not shown in detail) 136 can be chosen from MODE menu 132. Because RADIO menu 130 can be accessed from EQUAL menu 134, the RADIO, MODE, and EQUAL menus for a cycle of menus.

If desired, menus can be created and added to those shown in this preferred embodiment, with microprocessor 38 of FIG. 3 maintaining control of both the menu currently being displayed and the identities of menus which may be reached from the menu currently being displayed. The displayable menus can be changed by replacing ROM 48 in FIG. 6 as additional controllable features are desired and/or developed for use with the controller.

Figure 9:
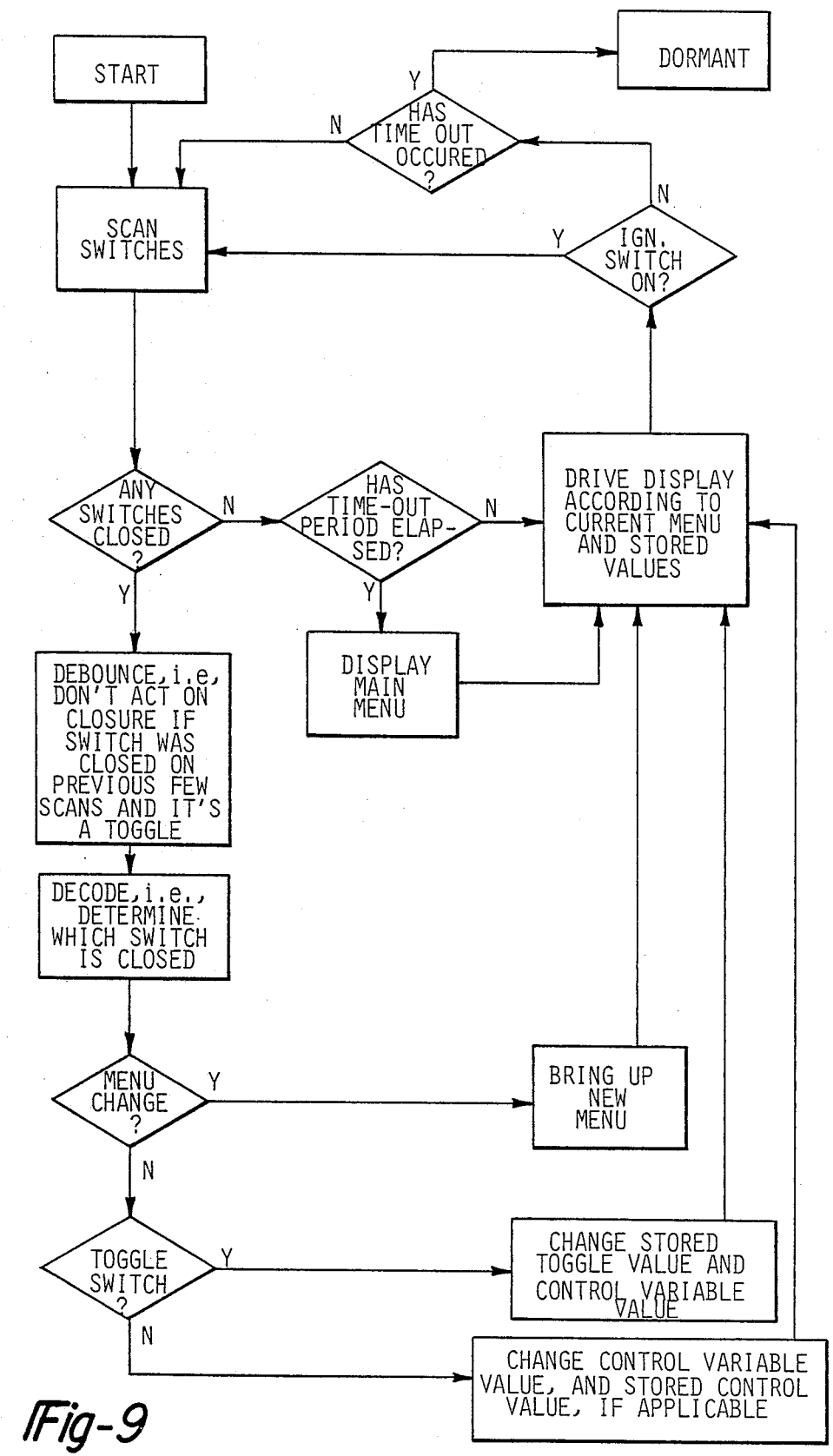
FIG. 9 is a flowchart of a computer program implemented by the microprocessor in one embodiment of the first assembly of the present invention.

FIG. 9 of the drawings illustrates a block diagram of the program to be performed by microprocessor 38 in FIG. 6. The microprocessor enters this phase from a dormant state through the activation of either the ignition switch or an interior light. The first step for microprocessor 38 is to scan the positions of the switches 16. If none of the switches is closed, microprocessor 38 checks to see whether a predetermined time interval since the last switch closure has lapsed. If so, the MAIN menu is selected for redisplay. Microprocessor 38 next causes display driver 46 to display the currently selected menu, possibly drawing stored values from non-volatile memory 50, such as the frequency to which the radio is presently tuned. Then microprocessor 38 checks to determine whether the ignition switch is on. If it is, the program returns to scan the switch array. If the ignition switch is off, the display was activated by turning on an interior light and microprocessor 38 then determines whether the display has been on for more than a nominal period of time, say, 30 seconds. If this time period has been exceeded, the controller resumes a dormant state to save electrical power. Otherwise, the program returns to scan the switches.

If, after scanning the switches, microprocessor 38 determines that one has been close, the signals produced by this closure are next passed through a debounce operation. If the switch closed is operated as a toggle switch in connection with the current menu and if it was closed during the previous few iterations through the flowchart shown in FIG. 9, the present closure is ignored. This is done to prevent the rapid accidental toggling between the conditions controlled by the switch which has been activated. Next, microprocessor 38 determines which switch has been closed. If the switch closure designates a menu change, microprocessor 38 acts to bring up data from ROM 48 required for the new menu including any values due to be displayed in connection with non-volatile memory. The microprocessor 38 then passes that information to display driver 46 over bus 56, which in turn passes the informatiom to displays 18 over bus 58.

If a menu change is not indicated, but a toggle switch (such as the ON/OFF switch for area 94 in FIG. 7A.) has been depressed, microprocessor 38 causes a value stored in non-volatile memory 38 to be changed along with the value of the control variable that is associated with that toggle switch. Microprocessor 38 then causes display driver 46 to update the display of the preesntly displayed menu by changing the value displayed in connection with the switch which was operated. Finally, if the switch operation is not a toggle switch, it must be an incremental switch (such as the fan control switch 96, in FIG. 7A). The incremental switch closure causes microprocessor 38 to change the value of the associated control variable in non-volatile memory 50 and to store the new value of the control variable, such as the radio frequency, if applicable. Following these changes in stored operations, microprocessor 38 causes the new value to be displayed in accordance with the current menu. The microprocessor then resumes the operations according to the flowchart with the first box, by scanning the switches of assembly 12.

While the detailed description given above has been expressed in relation to a preferred embodiment of the present invention, those skilled in the art will recognize that many modifications to this embodiment may be made without departing from the spirit of the invention. The scope and spirit of the present invention is to be limited only by the following claims.

We claim:

1. A control system for use by an operator of a vehicle for actuating a plurality of vehicular functions located remotely from the operator, said system comprising:
    (A) a plurality of discrete switches disposed upon the steering control of said vehicle, each switch adapted to selectably control a plurality of remotely located functions and each switch providing tactile feedback to the user;
    (B) discrete display means associated with, and in close proximity to each of said plurality of switches, each display means adapted to selectably provide a plurality of alterable function designators that specify the particular function being controlled by the associated switch;
    (C) control means including a microprocessor and adapted to: (1) receive signals indicative of the activation of each of said switches, (2) determine which alterable function designator is to be appropriately displayed in conjunction with each of said switches, (3) activate the display means of said appropriate designator, and (4) provide control signals in response to the activation of each of said switches; and,
    (D) means adapted to receive the control signals and distribute said signals to the appropriate function which is to be controlled, whereby each switch is adapted to operate in cooperation with the control means so as to control a plurality of said vehicular functions, and the display means associated with each switch is adapted to display which of said functions is being controlled at a given time.

2. A control system as in claim 1, wherein said control means is further adapted to cause each of said display means to display a preselected designator in response to the activation of one of said switches.

3. A control system as in claim 2, wherein said preselected designators correspond to the last previously displayed designations.

4. A control system as in claim 1, wherein said control means is further adapted to cause each of said display means to display a preselected designator each time the vehicle is energized.

5. A control system as in claim 1, wherein said control means is further adapted to cause each of said display means to display a preselected designator upon the passage of a predetermined length of time in which none of said plurality of switches is activated.

6. A control system as in claim 1, further including non-volatile memory means associated with the microprocessor.

7. A control system as in claim 1, further including a read-only memory associated with the microprocessor.

8. A control system as in claim 7, wherein the read-only memory contains a program to be executed by the microprocessor.

9. A control system as in claim 1, further including means for transmitting control signals from the control means to the receiving and distributing means.

10. A control system as in claim 9, wherein the control signal transmission means includes means for providing an optical signal and means for reviewing said optical signal.

11. A control system as in claim 9, wherein the control signal transmission means includes means for producing a variable magnetic signal and means for reviewing said magnetic signal.

12. A control system as in claim 11, wherein said receiving and distributing means is adapted to transmit signals to the control means indicative of the status of at least one of said vehicular functions, said control means operative to control at least one of said display means in accord with the transmitted signal, so as to indicate the status of said at least one vehicular function.

13. A control system as in claim 9, wherein said control signal transmission means is further adapted to transmit signals from the receiving and distributing means to the control means.

14. A control system as in claim 1, wherein said control means has associated therewith a power source including a battery.

15. A control system as in claim 1, wherein said control means has associated therewith a power source including photovoltaic cell.

16. A control system as in claim 1, wherein the control means is further adapted to activate the display means in a predetermined pattern of designators, said pattern corresponding to a related vehicular function.

* * * * *